United States Patent [19]

Song

[11] Patent Number: 4,933,151
[45] Date of Patent: Jun. 12, 1990

[54] DEVICE FOR MAGNETICALLY TREATING HYDROCARBON FUELS

[76] Inventor: Ben C. Song, 612 Oregon Ave., Palo Alto, Calif. 94301

[21] Appl. No.: 285,148

[22] Filed: Dec. 16, 1988

[51] Int. Cl.$^5$ .............................................. B01T 19/08
[52] U.S. Cl. .................................. 422/186.01; 210/222
[58] Field of Search .................... 422/186.01; 210/222

[56] References Cited

U.S. PATENT DOCUMENTS

| | | | |
|---|---|---|---|
| 430,462 | 6/1890 | Bull | 422/186.01 |
| 2,317,774 | 4/1943 | Kiek et al. | 209/215 |
| 2,825,464 | 3/1958 | Mack | 210/222 |
| 3,059,910 | 10/1962 | Moriya | 261/72 |
| 3,060,339 | 10/1962 | Moriya | 313/153 |
| 3,228,878 | 1/1966 | Moody | 210/222 X |
| 3,349,354 | 10/1967 | Miyata | 335/209 |
| 3,680,705 | 8/1972 | Happ et al. | 210/222 |
| 3,830,621 | 8/1974 | Miller | 431/356 |
| 4,026,805 | 5/1977 | Fowler | 210/223 |
| 4,050,426 | 9/1977 | Sanderson | 123/119 E |
| 4,188,296 | 2/1980 | Fujita | 210/222 |
| 4,216,092 | 8/1980 | Shalhoob et al. | 210/222 |
| 4,265,746 | 5/1981 | Zimmerman, Sr. et al. | 210/695 |
| 4,265,754 | 5/1981 | Menold | 210/220 |
| 4,265,755 | 5/1981 | Zimmerman | 210/222 |
| 4,366,053 | 12/1982 | Lindler | 210/222 |
| 4,367,143 | 1/1983 | Carpenter | 210/222 |
| 4,414,951 | 11/1983 | Saneto | 210/222 X |
| 4,564,448 | 1/1986 | O'Meara, Jr. | 210/222 |
| 4,569,737 | 2/1986 | Sakata | 585/899 |
| 4,601,823 | 7/1986 | Beck | 210/222 |
| 4,611,615 | 9/1986 | Petrovic | 210/222 X |
| 4,716,024 | 12/1987 | Pera | 422/186.01 |

FOREIGN PATENT DOCUMENTS

| | | |
|---|---|---|
| 57-122261 | 7/1982 | Japan . |
| 58-71993 | 4/1983 | Japan . |
| 58-225189 | 12/1983 | Japan . |
| 60-221489 | 11/1985 | Japan . |
| 814269 | 6/1957 | United Kingdom . |

*Primary Examiner*—Stephen J. Lechert, Jr.
*Assistant Examiner*—Nina Bhat
*Attorney, Agent, or Firm*—Burns, Doane, Swecker & Mathis

[57] ABSTRACT

This invention provides a device for magnetically treating fluid hydrocarbon fuels. The device provided by this invention is a simplified device which is effective because of the use of flat circular magnets having an opening in the center of the magnets. The device is configurated so that the fuel passes only through the center opening in the magnet and is thereby uniformly treated by the uniform focused field in the center of the circular magnet. The magnetic field is further focused and intensified by the use of pole plates which are also circular having a circular opening in the center wherein the pole plate circular opening is smaller than the circular opening in the flat circular magnet. In one form this invention provides an inline device where the fluid passes through the device and through the center openings in the magnets. In another aspect this invention provides a similar device in a form of an assembly of a circular magnets adapted to receive a nonmagnetic conduit through the center openings in the circular magnets and pole plates whereby the fluid is passed through the nonmagnetic conduit, and is treated in the uniform focused magnetic fields in the center openings of the circular magnets and pole plates.

9 Claims, 2 Drawing Sheets

DEVICE FOR MAGNETICALLY TREATING HYDROCARBON FUELS

FIELD OF THE INVENTION

This invention relates to the field of apparatus for magnetic treatment of fluid hydrocarbon fuels.

BACKGROUND OF THE INVENTION

There have been numerous magnetic devices proposed for the treatment of fuel to promote more efficient combustion, better efficiency and reduced emissions. For example, such devices are disclosed in U.S. Pat. No. 3,830,621 to Miller; U.S. Pat. No. 4,188,296 to Fujita; U.S. Pat. No. 4,569,737 to Sakata; and U.S. Pat. No. 4,716,024 to Pera. Other devices for magnetic treatment of fuels are disclosed in the published Japanese patent applications No. 57/122216 of Akai; No. 58/71993 of Hori; and No. 58/225189 of Katayama. Similar magnetic devices are disclosed in U.S. Pat. No. 4,265,746 to Zimmerman, et al.; U.S. Pat. No. 4,265,754 to Menold; and U.S. Pat. No. 4,265,755 to Zimmerman, but are for treatment of water. The disclosures of the above references are incorporated herein by reference.

While the devices disclosed in the above patents and published applications have varying degrees of effectiveness for their intended uses, the devices and system disclosed therein are unduly complex and costly to manufacture and use. There is a need for a device for magnetically treating fuels, which is simpler in construction and use and which is more effective. Therefore, it is an objective of this invention to provide a simplified device for the magnetic treatment of fuels while also increasing the effectiveness of the device.

SUMMARY OF THE INVENTION

This invention provides a device for magnetic treatment of fluid fuels which is lower in cost, more practical to use and is more effective.

In one aspect, this invention is a device for magnetically treating a fluid comprising a nonmagnetic housing having fluid inlet and outlet ports, a circular magnet body having a circular opening at the center thereof and being positioned in the housing whereby the fluid flow is restricted to a path from the inlet port through the opening at the center of the magnet body to the outlet port.

In another aspect, this invention is such a device wherein the magnet body comprises a plurality of flat circular magnets positioned adjacent to each other.

In another aspect, this invention is such a device wherein the magnet body comprises two or more flat circular pole plates each having a circular opening at the center and each positioned between two adjacent magnets so as to restrict the fluid flow to a path through the openings at the center thereof, wherein the outside diameter of the circular pole plates substantially corresponds to that of the circular magnets and the diameter of the opening at the center of the pole plates is smaller than the diameter of the opening at the center of the magnets.

In another aspect, this invention is such a device wherein the magnet body comprises a flat circular pole plate positioned on each end of the magnet body so as to restrict the fluid flow to a path through the openings at the center thereof, wherein the outside diameter of the circular pole plates substantially corresponds to that of the circular magnets and the diameter of the opening at the center of the pole plates is smaller than the diameter of the opening at the center of the magnets.

In another aspect, this invention is a device for magnetically treating a fluid comprising a circular magnet body having a circular opening at the center thereof adapted to receive therethrough a nonmagnetic conduit through which the fluid passes, wherein the magnet body comprises a flat circular pole plate positioned on each end of the magnet body or comprises a plurality of flat circular magnets and a plurality of pole plates each positioned between two adjacent magnets and wherein the outside diameter of the circular pole plates substantially corresponds to that of the circular magnets and the diameter of the opening at the center of the pole plates is smaller than the diameter of the opening at the center of the magnets.

In another aspect, this invention is an assembly for magnetically treating a fluid comprising a circular magnet body having a circular opening at the center thereof and a nonmagnetic conduit positioned in and extending through said opening through which the fluid passes. In this aspect of the invention, the magnet body can also have pole plates positioned on the ends thereof or in the body thereof between the flat circular magnets as described above.

DESCRIPTION OF THE INVENTION

Figure 1:
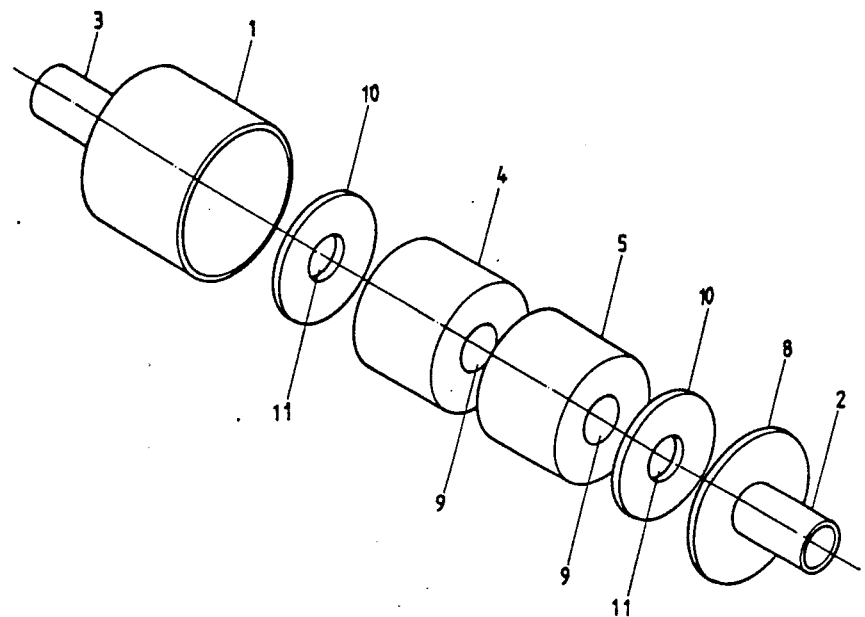
FIG. 1 shows an exploded prospective view of one embodiment of this invention comprising a magnet body and pole plates on the ends of the magnet body.

This invention is based upon the discovery that the magnetic treatment of liquid or gaseous hydrocarbon fuels can be effectively accomplished by a simple and low-cost device by employing the unique features and properties of flat circular magnets. It has been found that the devices of this invention employing the flat circular magnets are effective for treating fluid hydrocarbon fuels without involving the complexity of and consequently the cost involved in previous devices.

This invention is based upon the realization that the flat circular magnet shape provides a very focused but uniform magnetic field in a circular opening in the center portion of the flat circular magnet. Therefore, the devices of this invention are designed to provide effective treatment of fuels by passing the fuels only through the circular opening in the center of the flat circular magnet. The devices of this invention thereby provide very uniform magnetic treatment of the fuel. It has been found that it is unnecessary and, in general, undesirable to pass the fluids through other portions of the magnetic fields associated with or surrounding the flat circular magnet because that results in non-uniform treatment of the fuel. I have found that passing the fuel through the uniform, focused magnetic field in the opening at the center of the flat circular magnet provides more uniform and effective treatment of the fuel.

In its basic aspect, the device of the present invention comprises a nonmagnetic housing containing a circular magnet body positioned together so that the fuel passing through the inlet port of the housing is restricted to follow a path through the circular opening in the center of the circular magnet body then exit from the device through the outlet port of the housing. This basic aspect is illustrated by the embodiment shown in FIG. 1, which has nonmagnetic housing 1 comprising inlet port 2 and outlet port 3 with flat circular magnets 4 and 5 adapted to fit into housing 1. The housing also has end piece 8 adapted to mate with housing 1 to close the housing and hold the magnets in the desired position to provide the restricted flow path through the center openings in the circular magnets. End piece 8 can be sealed to housing 1 by any desired means, such as threads, adhesives, and the like.

When assembled, this embodiment provides a device where the fluid flow is restricted to pass through inlet port 2 through the circular openings 9 in magnets 4 and 5 and exit through outlet port 3. FIG. 1 also shows a preferred embodiment comprising pole plates 10 which may be positioned on each end of the magnet body which is made up of magnets 4 and 5. Pole plates 10 comprise ferromagnetic materials such as iron. When in position on each end of the magnet body the pole plates provide a focusing of the magnetic field strength into the circular openings 11 in the pole plates 10, which intensifies the magnetic field through which the fluid passes. However, because of the circular configuration of the magnets and pole plates, the magnetic field in each center opening is uniform, at least radially, which provides the desired uniform treatment of the fluid. This preferred configuration of the magnet body, i.e., including the pole plates, further enables the more effective treatment of fuel with the simple, low cost device of this invention.

If desired the magnet body may have a plurality of magnets, as shown in FIG. 1, with or without a plurality of pole plates 10, as shown in FIG. 1, or may simply comprise a single circular magnet in the housing. The selection and make up of the magnet body will be determined by the desired treatment for a particular fluid, flow rates and the like.

Optionally, gaskets or O-rings may be used in the arrangement of the magnets and pole plates to effect the desired seal between the magnets, plates, housing and end piece to provide the desired restricted flow path for the fuel through the openings at the center of the circular magnets and any pole plates that are present. It is to be understood that other housing configurations and designs may be used in accordance with this invention and that the embodiment shown here is merely an example of how the restricted flow path through the center of the circular magnets can be achieved.

As used herein, the term "magnet" means either a permanent magnet or an electromagnet which provides a desired magnetic field. The term "nonmagnetic" means any material such as plastic, aluminum, rubber, certain stainless steels and other materials which are not attracted to or affected by the magnet or magnetic field. The term "magnetic" means a material, such as a ferromagnetic metal, which is attracted and affected by the magnetic field produced by the magnet body.

Figure 2:
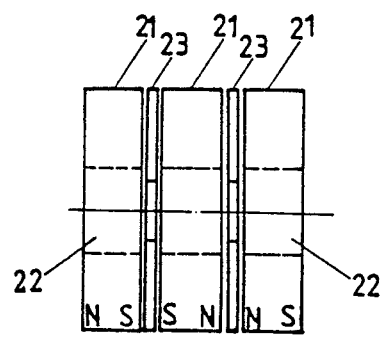
FIG. 2 is a side view of a magnet body of the present invention showing pole plates positioned between the flat circular magnets in the magnet body.

In an illustration of an alternative embodiment of the present invention, FIG. 2 shows the magnet body made up of a plurality of flat circular magnets 21 having circular openings 22 at in the center of each and pole plates 23 positioned between and alternating with the flat circular magnets. While FIG. 2 only illustrates 3 flat circular magnets and 2 pole plates, it is to be understood that the device of this invention can be constructed to provide any degree of power or intensity of the magnetic field by increasing the size and/or number of the circular magnets and/or pole plates.

Figure 3:
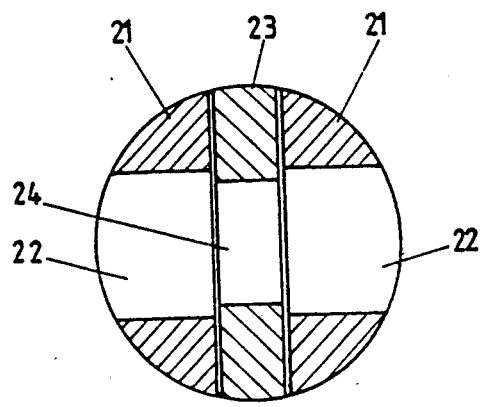
FIG. 3 shows a cross section detail of the relative sizing of the circular openings at the centers of the flat circular magnets and the flat circular pole plates.

FIG. 3 illustrates another preferred feature of the pole plate aspect of the invention in that the diameter of the circular opening in the center of each pole plate is smaller than the diameter of the circular opening in the center of the circular magnets. The extension of the pole plates at the center opening beyond the surface of the magnets serves to intensify and focus the magnetic field in the circular opening at the center of the pole plate.

It is believed that the unusual effectiveness of the devices of this invention is made possible by the uniform nature of the focused magnetic field of the circular magnets which have the circular opening at the center thereof. It is further believed that the effectiveness of the devices of this invention are enhanced by the presence of the pole plates having the same circular configuration as the circular magnets and where the surfaces of the pole plates extends inwardly toward the center beyond the surfaces of the magnets.

FIG. 3 shows in cross-section a detail of the circular magnets 21 and a pole plate 23 and illustrates that the circular openings 22 in the magnets are larger in diameter than opening 24 in the pole plate 23.

Figure 4:
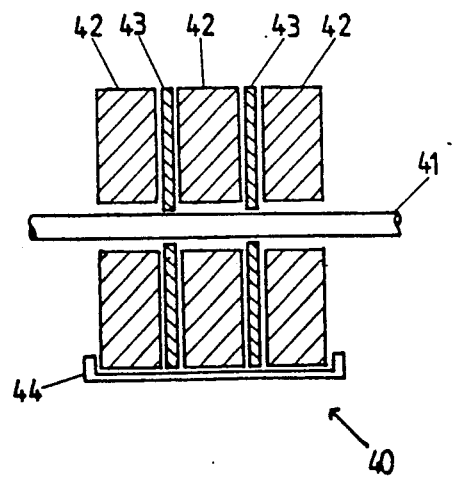
FIG. 4 is an illustration of an embodiment of the assembly aspect of the present invention.

FIG. 4 illustrates another aspect of this invention which is an assembly comprising the magnet body 40 and a nonmagnetic conduit 41 through which the fuel is passed through the conduit and consequently through the magnetic field in the circular opening in the center of the magnet body. The magnetic body illustrated in this embodiment comprises flat circular magnets 42 and optional but preferred pole pieces 43 held in position by holder means 44. The nonmagnetic conduit serves to cause the fuel to flow through the center circular opening of the magnet body and thus through the focused magnetic field in the opening at the center of the magnet body, which magnetic field is not changed or distorted by the nonmagnetic conduit being present therein.

It has been found that when the magnets are adjacent to each other, with or without the pole plates positioned on the ends of the magnet body a illustrated in FIG. 1, it is not important what the respective position of the magnet poles are with respect to each other. It is preferred, however, that opposite poles, i.e., north and south, be adjacent to each other However, when pole plates are positioned between the flat circular magnets as illustrated in FIG. 2, like poles must be positioned on opposite sides of each pole plate as illustrated in FIG. 2. It has been observed that the flow of fuel in either direction through the center of any particular circular magnet body according to this invention is effective. It has also been observed that any strength of magnet has some effectiveness on the fuel being treated, however, it is preferred to have magnet strength in the range of at least 100 gauss and preferably at least about 300 gauss, and more preferably at least about 500 gauss.

As an example of the unexpected effectiveness of the present invention, a device as illustrated in FIG. 1 having a magnet body comprising 3 flat circular magnets having outside diameter of 1⅛ inch and a ⅜ inch diameter circular opening in the center. The thickness of each circular magnet was ¼ inch. Two ferromagnetic pole plates were positioned between the magnets as shown in FIG. 2; they were ⅛ inch thick, 1⅛ inch in diameter with a 5/16 inch circular opening in the center. The 3 magnets and 2 pole plates were assembled in an aluminum housing whereby the magnets and plates were positioned in the housing so that the fuel entered inlet 2 passed through the circular openings in the center of the 3 magnets and the 2 pole plates and exited through outlet 3. This device was installed on a Mack truck containing a Detroit/8V-92 diesel engine. The truck was tested on a dynamoneter before and after the installation of the above device in the fuel line leading to the diesel engine. The dynamoneter tests showed that the truck produced a 19% increase in horse power and produced a 51.5% decrease in smoke emission after the above device was installed in the engine fuel line.

I claim:

1. A device for magnetically treating a fluid comprising a nonmagnetic housing having fluid inlet and outlet ports, a circular magnet body having a circular opening at the center thereof and being positioned in the housing whereby the fluid flow is restricted to a path from the inlet port through the opening at the center of the magnet body to the outlet port, wherein the magnet body comprises a plurality of flat circular magnets positioned adjacent each other so as to restrict the fluid flow to a path through the openings at the center thereof.

2. A device according to claim 1 wherein the magnet body comprises two or more flat circular magnetic pole plates each having a circular opening at the center and each positioned between two adjacent magnets so as to restrict the fluid flow to a path through the openings at the center thereof.

3. A device according to claim 2 wherein the outside diameter of the circular pole plates substantially corresponds to that of the circular magnets and the diameter of the opening at the center of the pole plates is smaller than the diameter of the opening at the center of the adjacent magnets.

4. A device according to claim 1 wherein the magnet body comprises a flat circular magnetic pole plate positioned on each end of the magnet body so as to restrict the fluid flow to a path through the openings at the center thereof.

5. A device according to claim 4 wherein the outside diameter of the circular pole plates substantially corresponds to that of the circular magnets and the diameter of the opening at the center of the pole plates is smaller than the diameter of the opening at the center of the adjacent magnets.

6. A device for magnetically treating a fluid comprising a circular magnet body having a circular opening at the center thereof adapted to receive therethrough a nonmagnetic conduit through which the fluid flow is restricted, wherein the magnet body comprises a flat circular magnetic pole plate positioned on each end of the magnet body or comprises a plurality of flat circular magnets and a plurality of flat circular magnetic pole plates each positioned between two adjacent magnets and wherein the diameter of the opening at the center of the pole plates is smaller than the diameter of the opening at the center of the adjacent magnets.

7. An assembly for magnetically treating a fluid comprising a circular magnet body having a circular opening at the center thereof and a nonmagnetic conduit positioned in and extending through said opening adapted to carry a fluid through the circular opening at the center of the circular magnet body, wherein the magnet body comprises a flat circular magnetic pole plate positioned on each end of the magnet body or comprises a plurality of flat circular magnets and a plurality of flat circular magnetic pole plates each positioned between two adjacent magnets.

8. An assembly according to claim 7 wherein the outside diameter of the flat circular pole plates substantially corresponds to that of the circular magnets and the diameter of the opening at the center of the pole plates is smaller than the diameter of the opening at the center of the magnets.

9. An assembly according to claim 7 wherein the diameter of the opening at the center of the pole plates is smaller than the diameter of the opening at the center of magnets.

* * * * *